July 29, 1969     H. SIEBOLD     3,457,835
ROTARY FLUID DISPLACEMENT DEVICE
Filed June 1, 1967     2 Sheets-Sheet 1
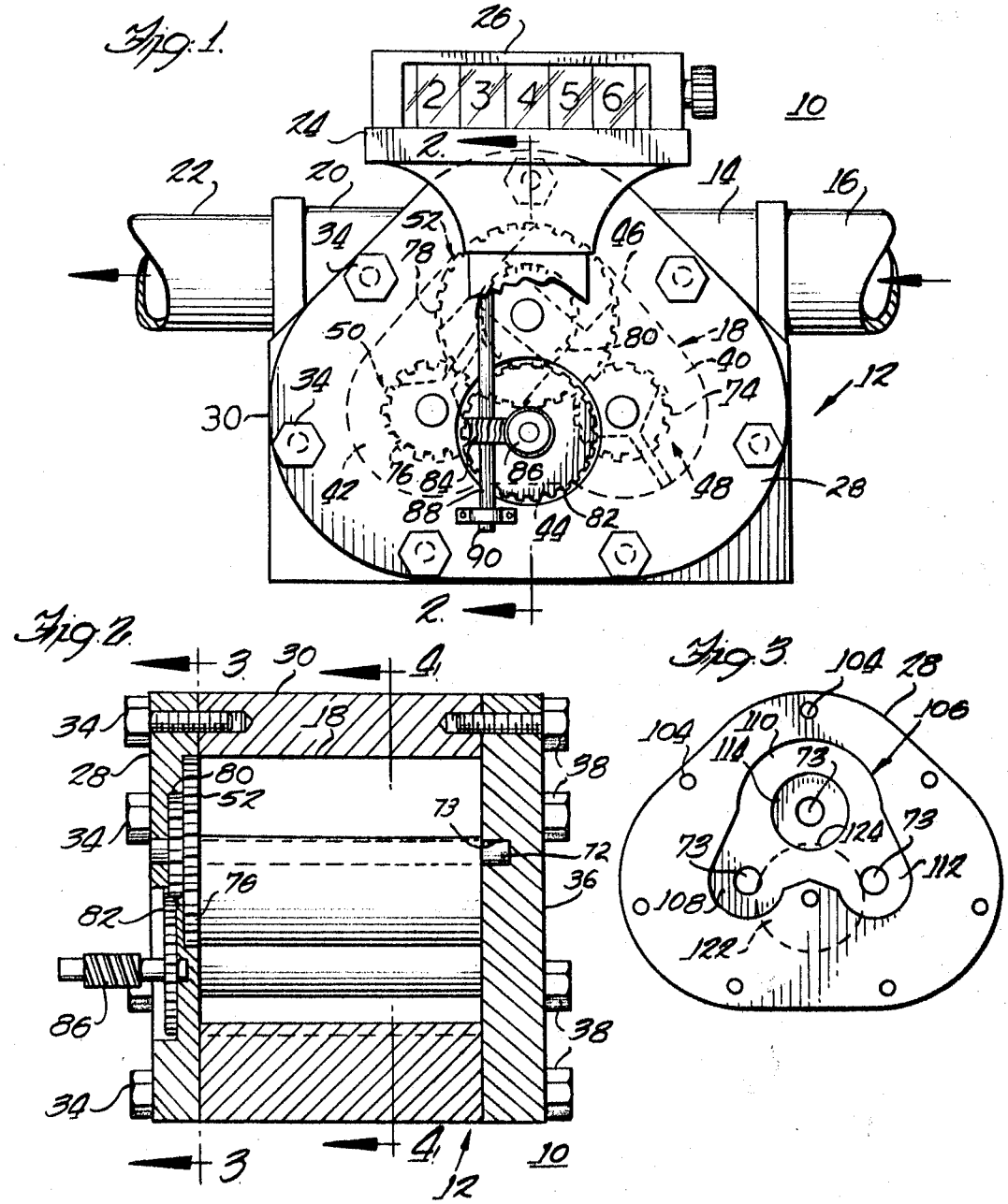
Inventor
Howard Siebold
Fidler, Bradley & Patnaude
Atty's July 29, 1969  H. SIEBOLD  3,457,835
ROTARY FLUID DISPLACEMENT DEVICE
Filed June 1, 1967  2 Sheets-Sheet 2
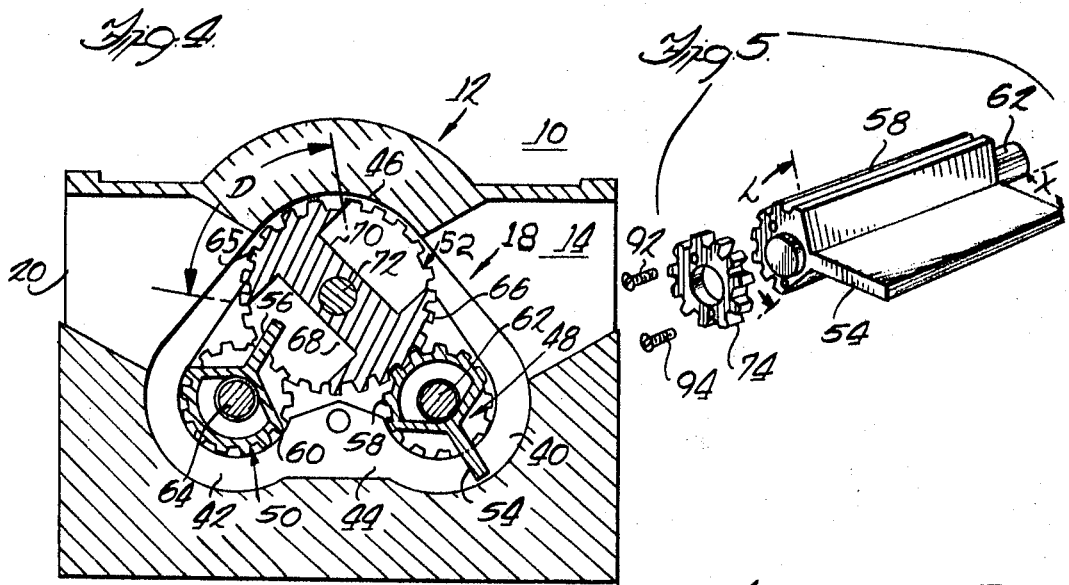
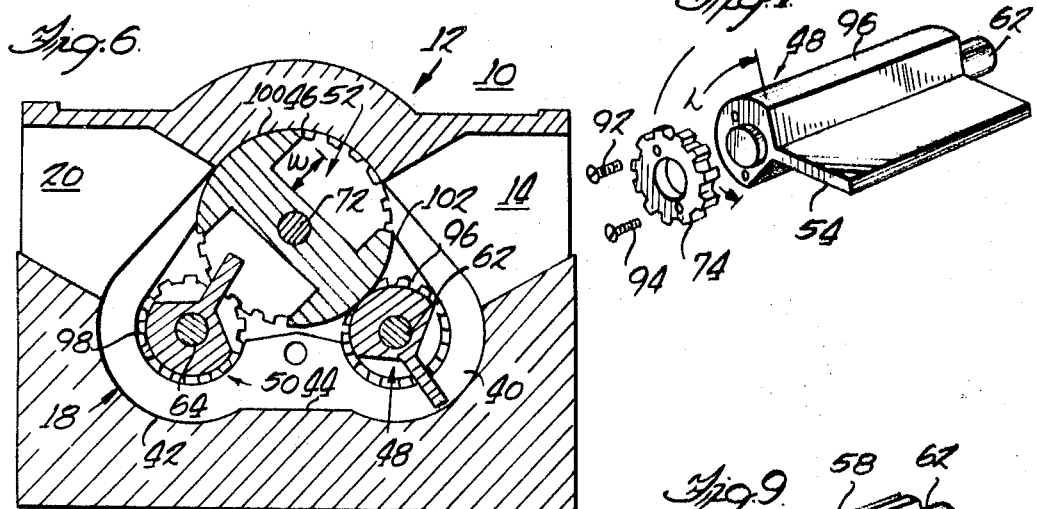
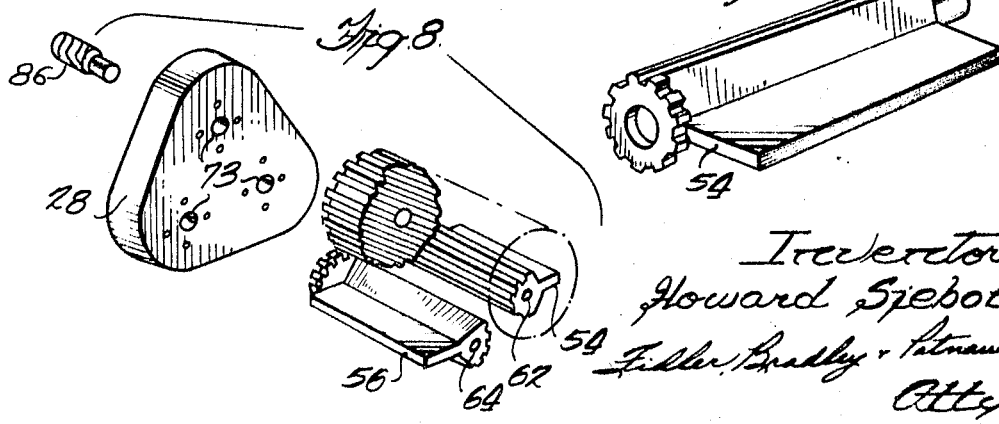
Inventor
Howard Siebold United States Patent Office 3,457,835
Patented July 29, 1969

3,457,835
ROTARY FLUID DISPLACEMENT DEVICE
Howard Siebold, Libertyville, Ill., assignor to Liquid Controls Corporation, North Chicago, Ill., a corporation of Illinois
Filed June 1, 1967, Ser. No. 642,801
Int. Cl. F01c 17/02, 21/04; G01f 3/10
U.S. Cl. 91—92                  19 Claims

ABSTRACT OF THE DISCLOSURE

The rotors have engaging gear teeth cut in them, and have equal mating peripheral lengths to prevent the passage of fluid between them, and to prevent their surfaces from being galled and accumulating impurities. The timing gears for the rotors are mounted within the fluid chamber and may be molded integrally with the rotors. To provide a balanced thrust on the rotors, the end surface areas abutting the walls of the fluid chamber are equal. The center of gravity of each rotor lies along its longitudinal axis.

---

This invention relates to rotary fluid displacement devices, and more particularly relates to the rotors and rotor timing gears therefor.

When the rotary fluid displacement devices are used as meters, they must be free from inaccuracies, and when used as pumps or meters, they should be as free from wear as possible. In prior art fluid meters, slippage of the liquid between mating rotors is a source of inaccuracy. Moreover, the rotors and their hubs are subject to unnecessary wear in both pumps and meters. One form of this wear occurs where two rotors having different surface velocities contact each other causing galling. Another form of this wear occurs on bearing surfaces and this form of wear is increased by rotors that are not balanced.

Besides being subject to inaccuracies and unnecessary wear, some of the prior art fluid displacement devices are difficult and expensive to fabricate. They frequently include many separate parts, some of which are expensive to form due to machining operations.

The accuracy of meters and the efficiency and durability of pumps are affected adversely by impurities that lodge on the surfaces of the rotors and by turbulence in the fluid that is being metered or pumped. In prior art meters, impurities are sometimes caused to lodge on the surface of one rotor as it moves adjacent to a second rotor at a different tangential surface velocity so as to force the impurity between the two rotors. Turbulence is caused when one rotor passes close to another rotor, particularly when the rotors are moving in opposite directions.

In one type of rotary fluid displacement device, the rotors are synchronized with each other by timing gears mounted to the rotors and meshing with each other. Each of these gears is mounted outside of the fluid chamber, separated from the rotors by a fluid chamber wall through which a shaft protrudes to connect it to the rotor. With this prior art mechanization, the fluid displacement device is difficult to disassemble for cleaning. This difficulty is especially significant in fluid displacement devices that are used to meter foodstuffs since these meters must be frequently cleaned.

Another difficulty with prior art meters used to meter foodstuffs is that the rotors are expensive. They are expensive because they must be fabricated from metals that are expensive and difficult to machine such as stainless steel. These disadvantages are characteristic of all metals that are sufficiently strong to withstand the stress placed upon the rotors of the prior art meters and are also compatible with foodstuffs.

Accordingly, it is an object of this invention to provide an improved rotary fluid displacement device.

It is a further object of this invention to provide a fluid meter with improved accuracy and a meter or pump with improved durability and lowered cost.

It is a still further object of this invention to provide a fluid displacement device with reduced slippage and turbulence.

It is a still further object of this invention to provide a fluid displacement device in which the rotors are not subject to galling and are balanced both about their center of rotation and orthogonal thereto.

It is a further object of this invention to provide a fluid displacement device in which impurities are not readily lodged between rotating parts.

It is a still further object of this invention to provide a rotary fluid displacement device which may be inexpensively manufactured and yet have great strength.

It is a still further object of this invention to provide a fluid displacement device which may be easily disassembled for cleaning or repair.

It is a still further object of this invention to provide a fluid displacement device that is especially suitable for handling foodstuffs.

In accordance with the above and further objects of the invention, a rotary fluid displacement device is provided in which blocking and displacement rotors cooperate to meter or to pump fluid passing between an input port and output port of the fluid displacement device. The displacement rotors have a hub portion and a blade portion which form a moving seal together with the blocking rotor and wall portions of a fluid chamber as they force fluid towards the output port of a pump or are moved towards the output port of a meter.

The hub of the displacement rotors and peripheral convex portions of the blocking rotor each have serrations along their surfaces, which engage with one another in the manner of gear teeth as each displacement rotor cooperates with the blocking rotor in a working or displacement portion of its cycle of revolution. This type of engagement forms a fluid seal thus preventing slippage of the fluid in a meter or backflow in a pump. Stated another way, the resistance to the flow of fluid in a meter is directly proportional to the length between mating parts through which the fluid must flow and inversely proportional to the distance between these parts. The engaging serrations provide a maximum length of travel for the fluid and a minimum clearance between the parts for this travel, thus minimizing slippage and backflow. The reduced slippage increases the accuracy of a meter and the backflow increases the efficiency of a pump.

The mating serrated surfaces of the blocking rotor and the hubs of the displacement rotors travel with the same surface velocity. Besides providing for a smoother meshing of the serrations, the use of identical surface velocities decreases the tendency of impurities to become lodged between the surfaces. This is because the impurities are not pushed by the faster moving surface against the slower moving surface until the impurities are compressed between them. In prior art pumps and meters having different surface velocities for the mating parts the impurities are compressed between the mating parts and adhere to one of them.

Both the displacement rotors and the blocking rotors are balanced about their center of rotation. This reduces wear and provides for smoother operation by eliminating the tendency to pulsate that is present in rotary fluid displacement meters which do not utilize balanced parts. Moreover, the blocking rotors include depressions of sufficient depth to permit the blades of the displacement rotors to pass the blocking rotor during the return portion of the cycle of rotation for the displacement rotor without creating undue tubulence. This reduces turbulence during the return portion of the cycle of rotation which in turn increases the accuracy of a meter, the efficiency of a pump, and the reliability of both meters and pumps.

To enable the rotors to form a seal during a working portion of a cycle and clearance during the return portion of the cycle, the rotors must be accurately timed with respect to each other. For this purpose timing gears are mounted to each rotor, which gears mesh with each other. Such timing gears are known in prior art fluid displacement devices, but are mounted outside of the fluid chamber of such prior art devices. With the construction of this invention, the timing gears are mounted within the fluid chamber immediately adjacent to the rotors themselves. This provides for economy in manufacturing and assembly. It also permits the meters to be easily dismantled for cleaning and repair.

The rotors are axially balanced during their rotation by means of fluid pressure generated by the movement of the end surfaces of the rotors and timing gears with respect to the internal walls of the fluid chamber. Since the end surfaces of the timing gears have a greater area than the end surfaces of the rotors opposite to them, the axially directed fluid pressure generated by their motion relative to the walls of the fluid chamber must be equalized. This is accomplished by recessing the timing gears or by boring the internal walls adjacent to the timing gears. With this mechanization, the timing gears are mounted inside the fluid chamber and yet the rotors are balanced by the axially directed fluid pressure within the chamber.

The mounting of the timing gear within the fluid chamber also offers the possibility of achieving economy in another manner. The rotors and other parts of meters may be formed from suitable plastics such as Delrin, nylon, or any other suitable thermoplastic or thermosetting compound. Many of these materials are suitable for use in meters that meter foodstuffs.

When the rotors are manufactured of such plastics, it is especially economical to mold the timing gears directly to the rotors. Moreover, the serrations on the blocking rotors and displacement rotors provide an additional source of driving force to that of the gears. Since the driving force is applied along the entire axial length of the rotors during the working portion of their cycle of operation, the rotors are not stressed to the extent they would be if the force were always applied only through the timing gears. This reduced stress is especially important when plastic materials are used instead of metals.

The invention and the above noted and other features thereof will be better understood from the folowing detailed description when considered with reference to the accompanying drawings in which:

FIGURE 1 is an end elevational view of an embodiment of the invention with a portion broken away and in section;

FIGURE 2 is a vertical sectional view through the embodiment of FIGURE 1;

FIGURE 3 is a sectional view taken along the line 3—3 of FIGURE 2;

FIGURE 4 is a sectional view taken along line 4—4 of FIGURE 2;

FIGURE 5 is an exploded perspective view of a displacement rotor as used in the embodiment of FIGURE 1;

FIGURE 6 is a vertical sectional view of the interior of another embodiment of the invention;

FIGURE 7 is an exploded perspective view of a displacement rotor used in the embodiment of FIGURE 6;

FIGURE 8 is an exploded perspective view of the front cover and displacement rotors of an embodiment of the invention; and FIGURE 9 is a perspective view of a displacement rotor which may be used in an embodiment of the invention.

GENERAL FEATURES

In FIGURE 1 an elevational view, partially broken away and in section, of a meter 10 is shown having an outer casing 12 with an outer surface in the form of a prismatic octahedron, and with a trefoil inner fluid chamber 18. An inlet port 14 is adapted to receive the inlet pipe 16 and an outlet port 20 is adapted to receive the outlet pipe 22, both parts communicating with the inner fluid chamber 18. The octahedral outer casing 12 includes a hexagonal tubular portion 30 closed at one end by the front end plate 28, which is held thereto by the peripherally spaced bolts 34, and closed at the other end by the rear end plate 36, which is held thereto by the peripherally spaced bolts 38. The trefoil fluid chamber 18 includes a cylindrical input chamber 40, a cylindrical output chamber 42, a connecting chamber 44, and a blocking rotor chamber 46. A speed adaptor 24 and a counter 26 are mounted on the front of the meter to register the fluid passing therethrough.

Although a meter has been chosen as the preferred embodiment, it is to be understood that the invention applies equally well to fluid displacement pumps. The meter disclosed herein is a rotary displacement meter such as that more fully described in the U.S. Letters Patent No. 2,835,229 issued to George B. Richards on May 20, 1958 for "Rotary Positive Displacement Device for Liquids."

As best seen in FIGURES 4 and 5 an inlet displacement rotor 48 is rotatably journaled around the shaft 62 concentric with the inlet chamber 40, an outlet displacement rotor 50 is rotatably journaled around the shaft 64 concentric with the outlet chamber 42, and a blocking rotor 52 is rotatably journaled around the shaft 72 concentric with the blocking rotor chamber 46. The displacement rotor 48 includes a hub 58 and a radially extending blade 54, and the rotor 50 includes a similar blade 56 and a similar hub 60. The shafts 62, 64 and 72 are mounted by means of press fits within bores 73 in the two end plates 28 and 36 so as to stretch therebetween and rotatably support the rotors thereon. The blocking rotor 52 includes the two diametrically oppositely convex cylindrical portions 65 and 66 and two diametrically opposite recessed portions 68 and 70 separating the convex portions 65 and 66.

As best shown in FIGURE 1 the displacement rotors 48 and 50 each have one of the two timing gears 74 and 76 mounted to them and positioned adjacent to the front cover 28 within the fluid chamber 18. Likewise, the blocking rotor 52 has a timing gear 78 mounted to its end adjacent to the front cover 28 and engaging the gears 74 and 76 to rotate therewith in relation to the rotation of the displacement rotors. A coupling pinion 80 is concentrically mounted to the timing gear 78 to rotate therewith and engages the coupling gear 82. A worm 86 of a worm and wheel is mounted concentrically with the coupling gear 82 to rotate therewith and is engaged with the gear 84. A coupling shaft 88 is journaled at one end in the bearing 90 and is mounted concentrically with the worm gear 84 to rotate therewith. The shaft 88 is drivingly connected to the adaptor 24 to register the rotation of the timing gears in the fluid chamber. The adaptor in turn causes the counter 26 to register a number in relation to the rotation of the displacement rotors, thereby indicating the amount of fluid passing through the meter.

As best shown in FIGURE 2, the timing gears 74, 76, and 78, are recessed into the inside surface of the front cover 28. The coupling pinion 80 is further recessed into the cover plate 28 adjacent to the blocking rotor timing gear 78 and the coupling gear 82 is recessed into the outside surface of the front cover. A cut away portion in the plate 28 connects the recess for the coupling pinion 80 to the recess for the coupling gear 82 permitting the gear and pinion to mesh therein. The worm 86 which is mounted concentrically with the gear 82 turns the worm gear 84.

Fluid entering the inlet port 14 from the inlet pipe 16 passes through the inlet chamber 40, the connecting chamber 44, the outlet chamber 42, and the outlet port 20 to the outlet pipe 22 in that order. As best shown in FIGURE 4, the fluid upon entering the fluid chamber 18 exerts pressure upon the blade 54 of the inlet displacement rotor 48 causing it to rotate clockwise. During the working portion of its cycle, the inlet displacement rotor 48 is driven with its blade 54 in sealing relation to the wall of the inner chamber 18 and with its hub 58 in sealing relation with one or the other of the two convex portions 65 and 66 of the periphery of the blocking rotor 52.

During this portion of its cycle, the timing gear 74 which is mounted to the inlet displacement rotor 48, drives the blocking rotor 52 through its timing gear 78. The timing gear 78 accordingly drives the coupling pinion 80 and the timing gear 76 of the outlet displacement rotor 50. The outlet displacement rotor is at this time passing through a return portion of its cycle of revolution as shown best in FIGURE 4.

During this portion of the outlet displacement rotor's cycle, its hub 60 is passing adjacent to the inner wall of the outlet chamber 42 and its blade 56 is passing adjacent to the recessed portion 68 of the periphery of the blocking rotor 52. Considerable clearance is provided between the blade 56 and the blocking rotor and between the hub 60 and the walls of the fluid chamber 18.

As the fluid continues to flow through the meter, the inlet displacement rotor 48 will eventually be turned into the return portion of its cycle in which its blade 54 passes adjacent to one of the recessed surfaces 68 and 70 of the blocking rotor 52. In this position the outlet displacement rotor 50 passes through a working cycle at which time it drives the blocking rotor 52 and the inlet displacement rotor 48 through the timing gears.

Accordingly, the two displacement rotors successively alternate working cycles and return cycles so as to continuously operate the meter without pulsations. It is obvious that a pump operates in just a reverse manner with the displacement rotors alternately passing through working portions of their cycle of rotation and return portions of their cycle of rotation to drive the fluid between the inlet and the outlet port.

ROTOR CONSTRUCTION

In one embodiment of the invention, as best shown in FIGURES 4 and 5, the hubs 58 and 60 of the displacement rotors and the convex peripheral surfaces 65 and 66 of blocking rotor have a plurality of axial serrations or gear teeth cut into them. As best shown in the exploded perspective view of FIGURE 5, the inlet displacement rotor utilized in this embodiment includes a shaft 62 that is journaled within the serrated hub 58. A blade 54 extends radially across the longitudinal length of the displacement rotor. A timing gear 74 is adapted to fit around the shaft 62 and to be held to the hub 58 by means of the two screws 92 and 94 so as to turn therewith. The serrations on the hub 58 mesh with similar serrations on the convex peripheral surfaces 65 and 66 of the blocking rotor 52. The outlet displacement rotor 50 is similarly constructed to include a hub 60 having serrations which mesh with the serrations on the convex peripheral surfaces 65 and 66 of the blocking rotor.

The peripheral length L (FIGURE 5) of the hub of each displacement rotor is the same as the peripheral length D (FIGURE 4) of each of the convex peripheral portions of the blocking rotor 52. Moreover, the ratios of the radius of each hub to the number of teeth on its timing gear are equal and are equal to the ratio of the radius of the convex peripheral surfaces of the blocking rotor to the number of gear teeth on its timing gears. In contrast to prior art constructions having smooth peripheral surfaces which are of different lengths, the mating surfaces of each of the displacement rotors and the blocking rotor in the embodiments of this invention travel at the same tangential surface velocity, which velocity is proportional to its radius of revolution divided by the number of gear teeth on its timing gear. They also provide a high path-of-resistance for fluid between the mating surfaces. The resistance to fluid is directly proportional to the length of the path and inversely proportional to its area. The path through the hub and mating convex portion of a blocking rotor is curved around the serrations to provide an extremely narrow small area and long path for the fluid. Accordingly, there is very little slippage of fluid in a meter or backflow in a pump constructed in accordance with the teachings of this embodiment. Since their tangential velocities are the same, the surfaces do not rub against one another excessively and do not gall or scratch each other. Moreover, since the adjacent surfaces of the rotors are not moving tangentially with respect to each other, they do not force impurities therebetween so as to compress them into each other.

In the embodiment of the invention illustrated in FIGURES 6 and 7, the rotors do not have serrations. Even though the rotors do not include serrations or gear teeth along their hubs or convex peripheral surfaces, they have many advantages over prior art constructions.

In this embodiment the inlet displacement rotor 48 and the outlet displacement rotor 50 have smooth hub portions 96 and 98 respectively. Similarly, the blocking rotor 52 has the two smooth convex peripheral portions 100 and 102. The peripheral surface length of the hubs 96 and 98 are the same as the peripheral surface length of the hubs 58 and 60 in the embodiments of FIGURES 4 and 5. Similarly the lengths of the convex peripheral portions 100 and 102 of the blocking rotor 52 are the same as the convex peripheral portions 64 and 66 of the embodiment of FIGURE 4. Accordingly, the lengths L of the hub 96 and the length D of the convex peripheral portions 100 and 102 are the same. Therefore, in the embodiments of FIGURES 6 and 7 there will be no galling of the hubs 96 and 98 or the convex peripheral portions 100 and 102 of the blocking rotor nor will impurities be pressed onto these surfaces due to different tangential speeds with respect to each other as they pass one another.

In the embodiment of FIGURES 6 and 7 there is, however, less resistance to slippage than in the embodiment of FIGURES 4 and 5. Also the driving and timing of the rotors is controlled entirely by the timing gears with no support from the hubs and convex portions of the blocking rotor.

With either the embodiment of FIGURE 4 or the embodiment of FIGURE 6, the length X (as shown in FIGURE 5) of the blades on the displacement rotors is sufficiently short and the depth W of the concave portions 68 and 70 (as shown in FIGURE 6) of the blocking rotor is sufficiently deep to permit a large clearance. The large clearance reduces the turbulence during the return portion of the cycle of revolution of the rotors. During this portion of the cycle of revolution, the blades pass within the recessed portions of the blocking rotor and the tips of the blades have a substantial tangential velocity with respect to the recessed surfaces. In prior art constructions, the blades pass fairly close to the recessed surfaces creating a turbulence that reduces the smooth operation of the meter or the pump.

With the shortened blade of the rotors and the proper peripheral length of the hubs and convex surfaces, the center of gravity of the rotors appears at the center of its respective one of the shafts 62, 64 or 72. Stated another way, each of the rotors is balanced about its center of rotation. This reduces the wear and provides smoother operation of the fluid displacement device.

FIGURES 3 and 8 each show a different embodiment of front end plate for providing thrust balance of the respective rotors. In FIGURE 3, a sectional view through the line 3—3 of FIGURE 2, shows the inner surface of the front end plate 28 having a plurality of tapped holes 104 to accommodate the screws 34 for holding the end plate to the tubular portion 30 of the casing 12. A trefoil depression 106 within the inner surface of the end plate 28 includes the three depressed bores 108, 110, and 112 to accommodate the timing gears for the inlet displacement rotor, the blocking rotor, and the outlet displacement rotor respectively. The cylindrical recession 110 includes a counterbore 114 for accommodating the coupling gear 82. The three counterbores 73 are each located in the center of the three bores 108, 114, and 112, to hold the shafts 62, 72 and 64 respectively upon which shafts the rotors are rotatably journaled.

A cylindrical recession 122 is formed on the outer surface of the front end plate 28 to accommodate the coupling gear 82. The recessions 122 and 114 are interconnected through the aperture 124 through the adjoining side walls of the cylindrical depressions 114 and 122. The coupling pinion and gear 80 and 82 mesh within the aperture 124 to permit coupling between the inside of the fluid chamber and the outside of the meter.

By enclosing the timing gears within the depressions 108, 110, and 112, the pressure generated by fluid between the adjoining walls of the timing gear and the walls of the fluid meter is reduced. With this mechanization, the axially directed pressure generated by the rotation of the timing gears with respect to the inner surface of the front end plate 28 exactly balances the pressure generated by the motion of the ends of the rotors with respect to the inner surface of the back end plate 36 to balance the rotors. This fluid pressure provides a type of thrust bearing and reduces wear in the meter or pump.

In FIGURE 8 an exploded perspective view of another embodiment of a front end plate is shown, which embodiment does not include the recessed depressions. In order to balance the axial pressure on the rotors, the adjacent end surface areas of the timing gears and front end plate are made equal to the adjacent end surface areas of the opposite ends of the rotors and the rear end plates. To accomplish this, holes are drilled in the inner surface of the end plate 28 so that the remaining adjacent end surfaces of the end plate 28 and the timing gears have the same area as the surfaces of the opposite ends of the rotors.

In the embodiment of FIGURES 8 and 9 it can be seen that the rotors are formed integrally with the timing gears rather than being held thereon by screws. The enlarged perspective view of FIGURE 9 illustrates this embodiment best. Such a rotor may be molded out of a suitable plastic such as Delrin, nylon or any other thermosetting or thermoplastic material. This construction is economical in that the rotors are easily formed and easily assembled. In the embodiment of FIGURE 9 the hub portion includes the serrations 96, which serrations mate with similar serrations in the blocking rotor convex periphery. Since plastic materials are frequently not as rigid as metal materials, the added support along the serrations reinforces the timing gears so as to reduce the required strength of the rotors.

SUMMARY OF THE OPERATION OF THE ROTORS

It can be seen that each of the two displacement rotors 48 and 50 successively cooperates with the blocking rotor 52 to form a fluid seal during a working portion of its cycle of rotation, at which time it is moved by fluid passing between the inlet port 14 and the outlet port 20 when acting as a meter or it moves fluid therebetween when acting as a pump. During the return portion of its cycle, the displacement rotor 52 must return to its starting position for the working portion of its cycle without creating undue turbulence or interfering with the flow of fluid through the meter or pump. The displacement rotors 48 and 50 alternately proceed through their working cycles and return cycles so that one displacement rotor is always cooperating with the blocking rotor in a working portion of a cycle.

During the working portion of a cycle of rotation, the surface of the hub of a displacement piston contacts the convex peripheral surfaces of the blocking rotor. By including serrations in the surfaces of the rotors whereby the rotors are mechanically engaged with one another, the resistance to slippage or backflow of fluid during the working portion of the cycle is increased thus increasing the accuracy of the meter. Moreover, in embodiments in which the rotors and timing gears are molded integrally of plastic, the serrations along the rotors support the rotors in driving relationship and aid in the function of the timing gears thus enabling a weaker material to be used. This rotor construction is especially advantageous in meters that are used to meter foodstuffs.

Because the peripheral lengths of the hubs of the displacement rotors and the convex portions of the blocking rotor are equal in length, their surfaces do not move with respect to each other when they are adjacent to each other. This reduces galling or scraping of the type that occurs when surfaces of different lengths are used. Moreover, impurities are not impressed between the surfaces that are moving with respect to one another and caused to adhere to one of the surfaces.

The rotors are each balanced about their center of rotation. Stated another way, the center of rotation of each of the rotors lies along its shaft. Also the length of the blades of the displacement rotors is short enough and the depression of the blocking rotor is sufficiently deep to provide ample clearance. The balancing of the rotors reduces wear and the clearance between the blades and the recessed surfaces of the blocking rotor reduces turbulence.

By recessing the timing gears or by drilling holes in the inner surface of the front end plate adjacent to the gears, the axial pressure of fluid created by the surfaces moving with respect to each other is balanced on each side of the rotors. This provides a thrust balance for the rotors and alleviates pressure on the thrust bearings.

The mounting of the timing gears internally to the front end plate and the use of timing gears that are integral with the rotors reduces the cost of fabrication and simplifies the assembly and disassembly of the meter or pump. This reduces the initial cost and also permits easy dismantling for cleaning or repair.

What is claimed is:

1. In a rotary fluid displacement device of the type having a plurality of rotors which cooperate with one another within a fluid chamber, a combination of rotors comprising:

a first rotor having two convex portions and two depressed portions along its peripheral surface;

a second rotor having a radially extending blade and a convex portion;

a third rotor having a radially extending blade and a convex portion;

said convex portions of each of said second and third rotors contacting said convex portions of said first rotor over mating peripheral lengths; the mating peripheral lengths of said rotors being equal.

2. In the rotary fluid displacement device of claim 1, second and third rotors in which the radially extending blades are of sufficient lengths to form a sealing relation with the walls of said fluid displacement device during one portion of a cycle and sufficiently short to provide a substantially turbulence free clearance between the surface of said depression during a second portion of a cycle.

3. In the rotary fluid displacement device of claim 1, a combination of rotors in which the center of gravity of each of the rotors lies along the corresponding shaft supporting the rotors.

4. In the rotary fluid displacement device of claim 1, a plurality of timing gears mounted to said shafts within said fluid chamber, the adjoining area between the gears and the walls of the fluid chamber having an area equal to the area of the opposite end of its corresponding rotor that is adjacent to the walls of said fluid chamber.

5. In a rotary fluid displacement device of the type having a plurality of rotors which move adjacent to one another within a fluid chamber during portions of a cycle of rotation, a combination of rotors comprising:
   a first rotor having a plurality of serrations extending axially across the portion of its peripheral surface and a depression on another portion of its peripheral surface;
   a second rotor having a radially extending blade and a convex portion;
   said convex portion having axially extending serrations;
   the serrations of said first rotor and said second rotor meshing to form a seal against the flow of fluid during a first portion of their cycles of rotation;
   said blade extending to a position adjacent to the internal walls of said fluid displacement device during said first portion of a cycle and extending partially into said depression during a second portion of said cycle;
   each of said rotors including a timing gear;
   said timing gears meshing together to control the cycles of revolution of said rotors; and
   said timing gears being mounted within said fluid chamber.

6. In the rotary fluid displacement device of claim 5, a combination of rotors in which each of said timing gears are molded integrally with said rotors.

7. A rotary fluid displacement device comprising:
   a casing defining a fluid chamber communicating with the outside by means of an inlet port and an outlet port;
   a first rotor mounted within said fluid chamber;
   a second rotor mounted within said fluid chamber;
   said first and second rotors having peripheral surfaces which pass adjacent to each other during a portion of each cycle of rotation;
   the peripheral length of said mating portions of said rotors being equal;
   a first timing gear mounted concentrically with said first rotor to rotate therewith;
   a second timing gear mounted concentrically with said second rotor to rotate therewith;
   said first and second timing gears being engaged with each other so as to time the rotation of said first and second rotors;
   said timing gears being mounted within said fluid chamber; and
   said timing gears being molded integrally with said rotors and said rotors and timing gears comprising a suitable plastic material.

8. A rotary fluid displacement device according to claim 7 in which said rotors include serrations aligned with the teeth of said timing gears and positioned so that the serrations of said first rotor engage serrations of said second rotor.

9. A rotary fluid displacement device according to claim 8 in which the center of gravity of said rotors lies along a shaft mounted between the internal walls within said fluid chamber.

10. A rotary fluid displacement device comprising:
   a casing defining a fluid chamber communicating with the outside by means of an inlet port and outlet port;
   a first rotor mounted within said fluid chamber;
   a second rotor mounted within said fluid chamber;
   said first and second rotors having peripheral surfaces which pass adjacent to each other during a first portion of each cycle of rotation;
   the peripheral lengths of said mating portions of said rotors being equal;
   a first timing gear mounted concentrically with said first rotor to rotate therewith;
   a second timing gear mounted concentrically with said second rotor to rotate therewith;
   said first and second timing gears being engaged with each other so as to time the rotation of said first and second rotors;
   said timing gears being mounted within said fluid chamber;
   said timing gears being mounted adjacent to the walls of said fluid chamber; and
   said walls including depressions so that the adjoining areas between said gears and said walls have an area equal to the area of the opposite ends of said rotors.

11. A rotary fluid displacement device comprising:
   a casing defining a fluid chamber communicating with the outside by means of an inlet port and an outlet port;
   a first rotor mounted within said fluid chamber;
   a second rotor mounted within said fluid chamber;
   said first and second rotors having peripheral surfaces which pass adjacent to each other during a first portion of said cycle of rotation;
   the peripheral length of said mating portions of said rotors being equal;
   a first timing gear mounted concentrically with said first rotor to rotate therewith;
   a second timing gear mounted concentrically with said second rotor to rotate therewith;
   said first and second timing gears being engaged with each other so as to time the rotation of said first and second rotors;
   said timing gears being mounted within said fluid chamber;
   a third rotor;
   a third timing gear mounted to said third rotor to rotate therewith and engaged with a timing gear of said first rotor;
   said first rotor including depressed portions connect- two convex serrated peripheral portions;
   said second and third rotors including a hub with a blade extending radially therefrom;
   said blade having sufficient length to sweep adjacent to the walls of said fluid chambers;
   said depressions in said first rotor being sufficiently deep so that said blades pass adjacent thereto without coming into contact therewith;
   the hubs of said second and third rotors having axially extending serrations; and
   said first rotor and second and third rotors being positioned with respect to said timing gears to form a fluid tight seal between said first rotor and one of said second and third rotors at all times as the three rotors rotate.

12. In combination with a rotary fluid displacement device having internal walls forming a fluid chamber communicating with the outside through an inlet and an outlet port, a combination of rotors comprising:
   a first shaft mounted in said fluid chamber between the internal walls of said fluid displacement device;
   a first rotor journaled concentrically around said shaft;
   a second shaft mounted within said fluid chamber between the internal walls of said fluid displacement device;

a second rotor journaled concentrically around said second shaft;

a third shaft mounted within said fluid chamber between the internal walls of said fluid displacement device;

a third rotor journaled concentrically around said third shaft;

first, second and third timing gears concentrically mounted to said first, second and third rotors within said third chamber.

13. The combination of claim 12 in which said first rotor includes a depressed portion and each of said second and third rotors includes a longitudinally extending flange timed by said timing gears to sweep past said depressed portion of said first rotor.

14. The combination of claim 12 in which said timing gears are recessed within depressions in the internal walls of said fluid chamber.

15. The combination of claim 12 in which each of said rotors have mating peripheral surfaces that are of equal length in the direction of rotation of the respective rotors.

16. The combination of claim 12 in which said second and third rotors have surfaces mating with surfaces of said first rotor, the radius of the surfaces about the shaft of the corresponding rotor to the number of gear teeth on the corresponding timing gear being equal for all three rotors.

17. In the combination of claim 12, the timing gears being mounted adjacent to the walls of said fluid chamber and said walls including depressions so that the adjoining areas between said gears and said walls have an area equal to the area of the opposite ends of said rotors that is adjacent to the walls of the fluid chamber.

18. The combination of claim 12 in which each of said rotors includes a portion of its periphery having serrations and mating with a portion of the periphery of another of said rotors.

19. The combination of claim 18 in which the center of gravity in each of said rotors lies within a respective one of its shafts.

References Cited

UNITED STATES PATENTS

| | | | |
|---|---|---|---|
| 176,278 | 4/1876 | Button | 73—253 XR |
| 231,939 | 9/1880 | Shedd | 73—261 |
| 2,835,229 | 5/1958 | Richards | 91—92 XR |

CARLTON R. CROYLE, Primary Examiner

ALLAN D. HERRMANN, Assistant Examiner

U.S. Cl. X.R.

73—261